No. 849,720. PATENTED APR. 9, 1907.
L. BLESSING & A. JOHNS.
NUT LOCK.
APPLICATION FILED DEC. 10, 1906.
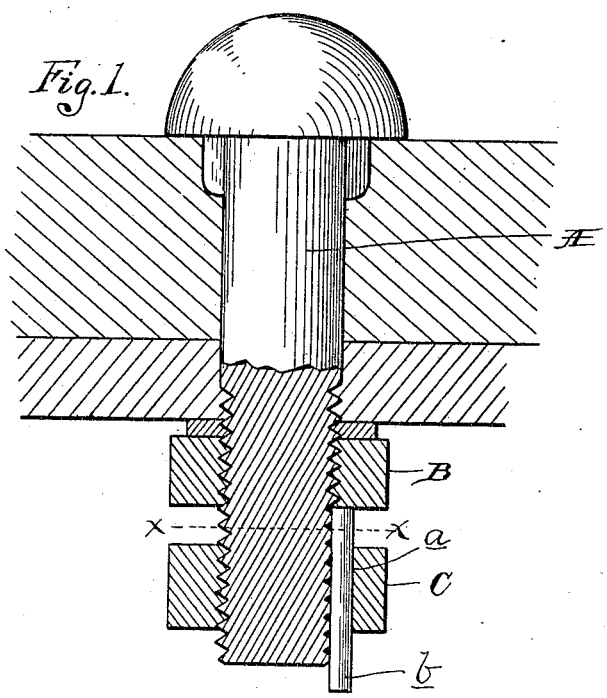
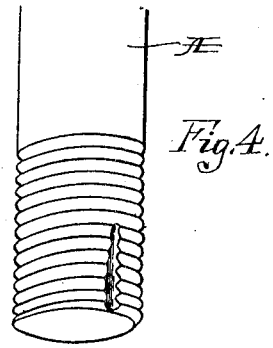
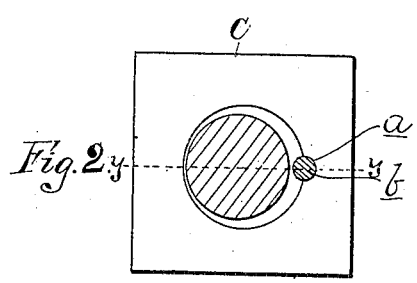
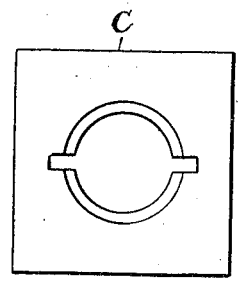
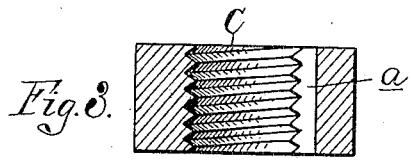
WITNESSES:
Oliver E. Barthel
Anna M. Dorr
INVENTORS:
Louis Blessing
and
Alfred Johns
By Barthel & Barthel
Attorneys

UNITED STATES PATENT OFFICE.

LOUIS BLESSING AND ALFRED JOHNS, OF JACKSON, MICHIGAN.

NUT-LOCK.

No. 849,720.  Specification of Letters Patent.  Patented April 9, 1907.

Application filed December 10, 1906. Serial No. 347,025.

*To all whom it may concern:*

Be it known that we, LOUIS BLESSING and ALFRED JOHNS, citizens of the United States of America, residing at Jackson, in the county of Jackson and State of Michigan, have invented certain new and useful Improvements in Nut-Locks, of which the following is a specification, reference being had therein to the accompanying drawings.

This invention relates to that kind of nut-lock in which the screw-bolt has a holding-nut and a locking-nut, the locking-nut preventing the holding-nut from accidentally unscrewing, but leaving it wholly free to be tightened; and the invention consists in the novel construction and arrangement of the parts, all as more fully hereinafter described, and shown in the accompanying drawings, in which—

Figure 1 is a section of the nut-lock in the plane of the axis of the bolt; Fig. 2, a cross-section of the nut-lock in the plane of line $x\,x$, Fig. 1. Fig. 3 is a detached section of the nut in the plane $y\,y$ in Fig. 2. Fig. 4 is a detached perspective view of the threaded end of the bolt, referring to a slightly-modified form of construction more especially referred to hereinafter; and Fig. 5 is a plan of a nut, referring to another modified form of construction referred to hereinafter.

A is the bolt, and B the holding-nut, both of which are of the ordinary description. In connection with this holding-nut a locking-nut C is used, which is the same as the holding-nut, but is additionally provided with an interior keyway $a$, adapted to receive a locking-key $b$. This locking-key fits the keyway in the locking-nut and is adapted to engage the threads of the bolt when driven into the keyway after the nut is screwed on to the bolt, thereby locking the nut in position and preventing the holding-nut from accidentally unscrewing. In adapting this old and known means of locking a nut to our present invention the holding-nut is first engaged with the bolt being screwed home and tightened. Then the locking-nut is engaged with the bolt, leaving a space between it and the holding-nut, and the locking-key is driven into the keyway of the locking-nut till it is brought up against the holding-nut and cannot be driven any farther. In this way the holding-nut is held by the key from unscrewing accidentally, while at the same time it can be tightened in the usual way. All that is required after tightening it is to give the key a few taps with the hammer to drive it up against the nut.

Our nut-lock is particularly adapted in cases where special conditions require a frequent tightening of the holding-nut, and to facilitate this use the end of the key is left to project more or less from the face of the locking-nut.

There is an advantage in having the locking-nut spaced from the holding-nut when it is desired to remove the locking-key, since the latter can be partially backed out of the keyway by first unscrewing the holding-nut with a powerful wrench as far as it will go. The key is thus started and partially loosened and can be taken hold of with better advantage for pulling it out completely, thus providing means for unlocking this form of nut-lock without destroying or damaging the parts.

The key may be slightly tapering to permit of its being driven in and cut its way through the threads of the bolt, or an initial keyway may be provided for in the end of the bolt, as shown in Fig. 3, and it is also within the scope of our invention to use keys of different cross-sections with keyways of corresponding shape, and instead of one keyway the nut may be provided with a plurality, as shown in Fig. 5.

Having thus fully described our invention, what we claim is—

1. In a nut-lock, the combination with the bolt, of a holding-nut and a locking-nut, the locking-nut spaced from the holding-nut and provided with an interior keyway, and a locking-key in said keyway, extending through the locking-nut inwardly into contact with the face of the holding-nut, and engaging with the threads of the bolt to resist the endwise displacement of the holding-nut.

2. In a nut-lock, the combination with the bolt, of a holding-nut and a locking-nut, the locking-nut spaced from the holding-nut and provided with an interior keyway, and a locking-key in said keyway extending outwardly beyond the face of the locking-nut and inwardly through said nut into contact with the holding-nut, said locking-key engaging with the screw-threads of the bolt to resist the endwise displacement of the holding-nut.

In testimony whereof we affix our signatures in presence of two witnesses.

LOUIS BLESSING.
ALFRED JOHNS.

Witnesses:
F. H. NEWKIRK,
CHAS. M. SPINNING.